United States Patent [19]
Matsumoto et al.

[11] Patent Number: 5,743,082
[45] Date of Patent: Apr. 28, 1998

[54] APPARATUS FOR DETECTING REDUCTION OF PURIFYING CAPACITY OF CATALYST FOR PURIFYING EXHAUST GAS FROM INTERNAL COMBUSTION ENGINE AND METHOD THEREOF

[75] Inventors: Takuya Matsumoto; Toru Hashimoto; Mitsuhiro Miyake; Hitoshi Kamura, all of Kyoto, Japan; Yasuhisa Yoshida, Corella New Port Beach, Calif.

[73] Assignee: Mitsubishi Jidosha Kogyo Kabushiki Kaisha, Tokyo, Japan

[21] Appl. No.: 535,641

[22] Filed: Sep. 28, 1995

[30] Foreign Application Priority Data

Sep. 30, 1994 [JP] Japan ..................... 6-237431
Sep. 30, 1994 [JP] Japan ..................... 6-237432
Sep. 30, 1994 [JP] Japan ..................... 6-237433

[51] Int. Cl.⁶ ....................................... F01N 3/20
[52] U.S. Cl. ........................ 60/274; 60/276; 60/277
[58] Field of Search ................. 60/276, 277, 285, 60/274; 123/688

[56] References Cited

U.S. PATENT DOCUMENTS

Re. 33,942  6/1992  Katsuno et al. .
4,739,614  4/1988  Katsuno et al. .
5,097,700  3/1992  Nakane .
5,311,737  5/1994  Komatsu .................. 60/276
5,337,555  8/1994  Tokuda ..................... 60/276
5,337,558  8/1994  Komatsu .................. 60/276
5,396,765  3/1995  Maruyama ............... 60/277
5,533,332  7/1996  Uchikawa ................. 60/277

FOREIGN PATENT DOCUMENTS

61-286550  12/1986  Japan .
3-249357   11/1991  Japan .

*Primary Examiner*—Douglas Hart

[57]  ABSTRACT

A detecting apparatus for a catalytic converter has a pair of $O_2$ sensors, arranged individually on the up- and downstream sides of the converter, and an electronic control unit for discriminating reduction of the purifying capacity of a three-way catalyst in the converter. This unit discriminates the reduction of the purifying capacity in accordance with the comparison between a decision value and the ratio between the respective frequencies of outputs from the $O_2$ sensors. In the case where the $O_2$ sensor on the upstream side is subject to thermal degradation, its decision value is corrected, or the decision itself is interrupted.

18 Claims, 10 Drawing Sheets

APPARATUS FOR DETECTING REDUCTION OF PURIFYING CAPACITY OF CATALYST FOR PURIFYING EXHAUST GAS FROM INTERNAL COMBUSTION ENGINE AND METHOD THEREOF

BACKGROUND OF THE INVENTION

1. Field of the Invention

The present invention relates to an apparatus and method for purifying exhaust gas from an internal combustion engine, and more particularly, to an apparatus and method for detecting reduction of the purifying capacity of a catalyst used to purify the exhaust gas 2. Description of the Related Art A catalytic converter is inserted in an exhaust pipe which extends from an internal combustion engine. This catalytic converter contains therein a three-way catalyst for purifying exhaust gas flowing in the exhaust pipe. After a prolonged use, the purifying capacity of the three-way catalyst is reduced below an allowable range. It is necessary, therefore, to provide an apparatus for detecting the reduction of the purifying capacity of the catalyst.

A detecting apparatus of this type is described, for example, in Jpn. Pat. Appln. KOKAI Publication No. 61-286550 (U.S. Pat. No. 4,739,61; U.S. Pat. Re. 33,942). This conventional detection apparatus comprises a pair of $O_2$ sensors, which are attached to the exhaust pipe so as to be situated individually on the up- and downstream sides of the catalytic converter. The $O_2$ sensors detect oxygen concentrations of exhaust gas on the up- and downstream sides of the catalyst, and output detection signals corresponding to those oxygen concentrations, individually.

Normally, the $O_2$ sensor on the upstream side is used for the feedback control of the air-fuel ratio of an air-fuel mixture to be supplied to the engine. Therefore, the output of this upstream $O_2$ sensor varies cyclically in accordance with the feedback control of the air-fuel ratio.

If the three-way catalyst functions normally, on the other hand, the oxygen concentration of the exhaust gas after flowing through the catalyst is substantially constant despite the feedback control of the air-fuel ratio, so that the output of the $O_2$ sensor on the downstream side hardly varies if the purifying efficiency of the three-way catalyst decreases as degradation of the catalyst advances, however, the oxygen concentration of the exhaust gas on the downstream side of the catalyst, like the one on the upstream side, varies under the influence of the feedback control of the air-fuel ratio.

Thus, reduction of the purifying capacity of the three-way catalyst can be discriminated in accordance with the variation of the outputs of the $O_2$ sensors on the up- and downstream sides, that is, the ratio between the respective frequencies of the sensor outputs.

The detecting apparatus discriminates the reduction of the purifying capacity of the three-way catalyst on the assumption that the $O_2$ sensors on the up- and downstream sides function normally. However, the $O_2$ sensor on the upstream side is liable to degradation, since it is always exposed to the exhaust gas whose temperature is higher and which contains more poisoning substances, such as sulfur, than the gas on the downstream side. If the $O_2$ sensor on the upstream side suffers degradation, the response of its output is subject to a delay, or the output itself lowers. In such a case, the detecting apparatus cannot give an accurate decision on the reduction of the purifying capacity of the three-way catalyst.

Disclosed in Jpn. Pat. Appln. KOKAI Publication No. 3-249357 (U.S. Pat. No. 5,097,700), on the other hand, is an apparatus which detects reduction of the purifying capacity of the three-way catalyst in accordance with the output of the $O_2$ sensor on the downstream side only. According to this detecting apparatus, a threshold value used to discriminate the reduction of the purifying capacity is corrected depending on the degradation of the downstream $O_2$ sensor.

However, the correction of the threshold value is controlled in accordance with change of the output of the downstream $O_2$ sensor in consideration of the occurrence of reduction of the purifying capacity of the three-way catalyst itself. Accordingly, this correction control cannot be applied to the $O_2$ sensor which is situated on the upstream side of the catalyst.

Thus, the apparatus for detecting the reduction of the purifying capacity of the three-way catalyst in accordance with the respective outputs of the $O_2$ sensors on the up- and downstream sides cannot avoid an erroneous decision attributable to the degradation of the $O_2$ sensor on the upstream side.

SUMMARY OF THE INVENTION

The object of the present invention is to provide an apparatus capable of accurately detecting reduction of the purifying capacity of a catalyst for exhaust gas purification without entailing an erroneous decision attributable to degradation of an $O_2$ sensor on the upstream side, The above object is achieved by a detecting apparatus according to the present invention, which comprises: first detecting means including a sensor disposed in an exhaust gas passage extending from an internal combustion engine so as to be situated on the upstream side of a catalytic converter, the sensor detecting a specific component in exhaust gas from the engine and delivering a first detection signal for the detected component; second detecting means for detecting the specific component in the exhaust gas flowing on the downstream side of the catalytic converter and delivering a second detection signal for the detected component; measuring means for delivering a purification signal indicative of the degree of reduction of the purifying capacity of a catalyst in the catalytic converter in accordance with the first and second detection signals delivered from the first and second detecting means; comparing means for comparing the purification signal from the measuring means with a reference value and delivering a comparison result indicative of the occurrence of reduction of the purifying capacity of the catalyst; degradation detecting means for detecting the degree of degradation of the sensor of the first detecting means and delivering the result of the detection; and control means for controlling the delivery of the result of the comparison from the comparing means in accordance with the detection result from the degradation detecting means.

Since the first detecting means is located close to the engine, it is susceptible to thermal degradation by the high-temperature exhaust gas from the engine. According to the detecting apparatus described above, however, the degree of degradation of the sensor is detected, and the delivery of the comparison result from the comparing means is controlled in accordance with the detection result, so that an erroneous decision cannot be given on the reduction of the purifying capacity of the catalyst.

The control means may include correcting means for correcting the reference value in the comparing means in accordance with the detection result from the degradation detecting means. In this case, the reduction of the purifying capacity of the catalyst can be discriminated accurately.

The measuring means may obtain the purification signal from the ratio between the respective frequencies of the first and second detection signals.

The degradation detecting means may obtain the degree of degradation of the sensor in accordance with the delay time of the response of the first detection signal delivered from the sensor.

The control means may include interrupting means for interrupting the delivery of the comparison result from the comparing means when an allowable value is exceeded by the detection result from the degradation detecting means. In this case, the comparison result is always accurate when it is delivered from the comparing means.

The detecting apparatus may further comprise third detecting means for detecting the operating state of the engine. In this case, the control means may include interrupting means for interrupting the delivery of the comparison result from the comparing means when the operating state of the engine detected by the third detecting means is in a specific state.

More specifically, the interrupting means interrupts the delivery of the comparison result from the comparing means when a throttle valve of the engine is fully closed and fuel supply to the engine is continued for a predetermined period of time, or when idle operation of the engine is continued for a predetermined period of time. Also in this case, the comparison result is always accurate when it is delivered from the comparing means.

Preferably, the interrupting means continues to interrupt the delivery from the comparing means during the passage of the predetermined period of time after the removal of the aforesaid specific state of the engine.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Figure 1:
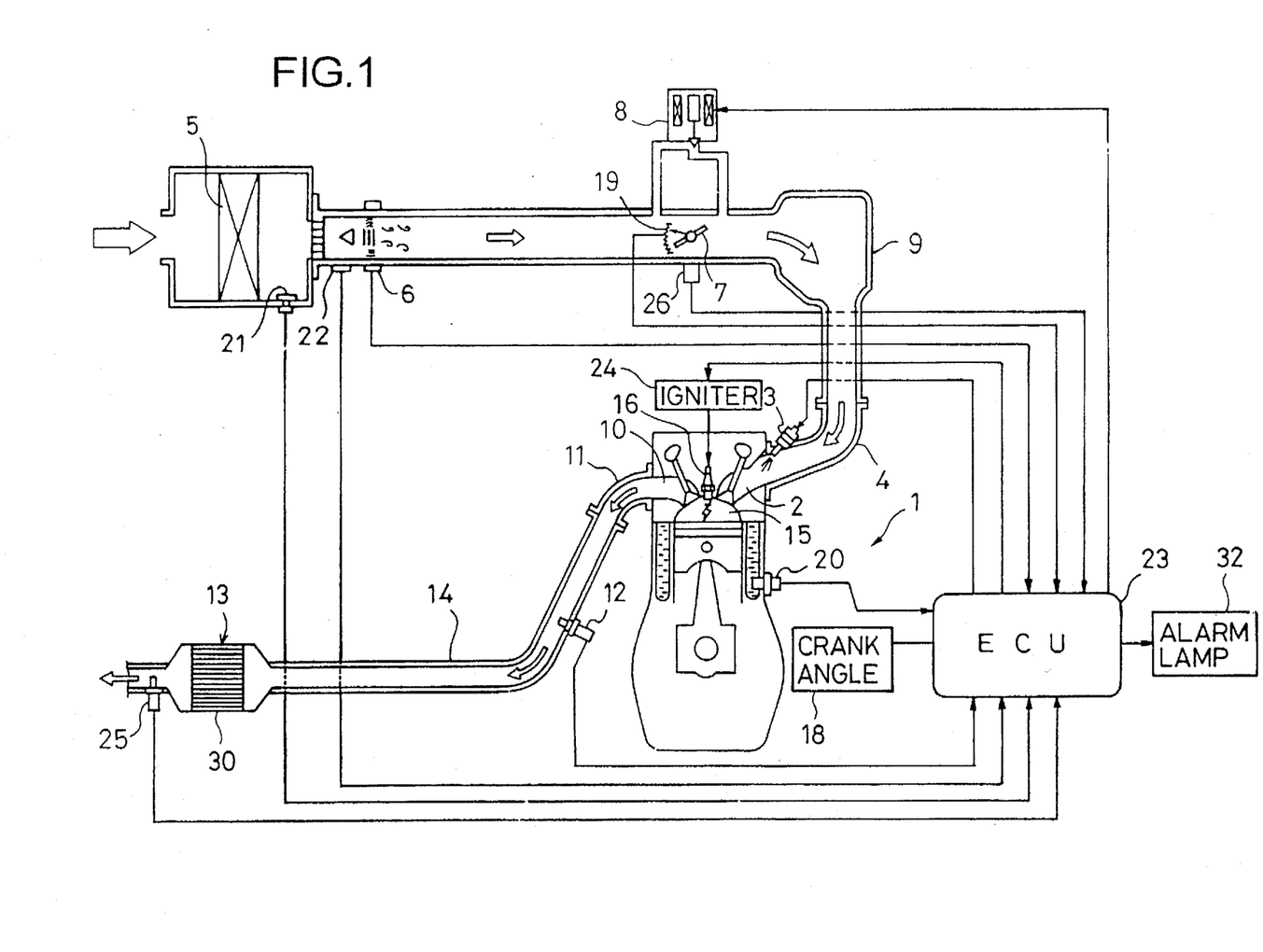
FIG. 1 is a schematic view of an internal combustion engine furnished with a detecting apparatus according to the present invention.

Referring to FIG. 1, an engine system of an automobile comprises an in-line six-cylinder gasoline engine 1. Each cylinder of the engine 1 has an intake port 2, which is connected with an intake manifold 4.

A fuel injector 3 is attached to each branch pipe of the intake manifold 4, and its nozzle is located in the vicinity of or inside its corresponding intake port 2. Upon receiving a pulse current, the fuel injector 3 ejects a fuel through its nozzle. The quantity of fuel injected from the fuel injector 3 is determined depending on the pulse width of the pulse current supplied to the injector 3.

An intake pipe 9 extends from the intake manifold 4, and an air cleaner 5 is connected to the distal end of the pipe 9. In the intake pipe 9, an airflow sensor 6 and a throttle valve 7 are arranged in the order named as viewed from the side of the air cleaner 5. A sensor of the Karman-vortex type is suitably used as the airflow sensor 6. Between the throttle valve 7 and the intake manifold 4, a surge tank is inserted in the intake pipe 9.

Further, the intake pipe 9 is provided with a bypass pipe for bypassing the throttle valve 7. An ISC (idle speed control) valve 8 is inserted in the by-pass pipe. The ISC valve 8 regulates the quantity of intake air flowing in the bypass pipe, and controls the idling speed of the engine 1. More specifically, when the load on the engine 1 increases with the actuation of an air conditioner of the automobile during idle operation of the engine 1, the opening of the ISC valve 8 is augmented. Accordingly, the quantity of intake air supplied to the engine 1 through the ISC valve 8 or the bypass pipe is increased, so that the idle operation of the engine 1 is stabilized.

Each cylinder of the engine 1 has an exhaust port 10, which is connected to an exhaust pipe 14 through an exhaust manifold 11. A muffler (not shown) is attached to the distal end portion of the exhaust pipe 14, and a catalytic converter 13 is inserted in the middle of the pipe 14. The catalytic converter 13 contains a three-way catalyst 30 therein. The three-way catalyst 30 serves to oxidize HC (hydrocarbon) and CO (carbon monoxide), out of HC, CO, and $NO_x$ (nitrogen monoxide, nitrogen dioxide, and other nitrogen oxides), and to reduce $NO_x$. The oxidation of HC and CO and reduction of $NO_x$ can be accelerated most efficiently when the air-fuel ratio, i.e., the ratio of the quantity of air to the quantity of the fuel supplied to the engine 1, is in the vicinity of a theoretical air-fuel ratio (e.g., 14.7).

Moreover, the exhaust pipe 14 is fitted with $O_2$ sensors 12 and 25 which are situated on the up- and downstream sides, respectively, of the catalytic converter 13. The $O_2$ sensors 12 and 25 detect the oxygen concentrations of exhaust gas from the engine 1, and generate voltage signals corresponding to the detected oxygen concentrations. Thus, the oxygen concentrations of the exhaust gas can be detected in accordance with outputs or voltage values delivered from the $O_2$ sensors 12 and 25.

Each cylinder of the engine 1 is provided with a spark plug 16, whose tip end projects into a combustion chamber 15 of the cylinder. Each spark plug 16 is connected electrically to an igniter which supplies high voltage to the plug 16. When supplied with the high voltage, the spark plug 16 ignites an air-fuel mixture in its corresponding combustion chamber 15. The air-fuel mixture is produced by injecting the fuel from the fuel injector 3 into air which is fed into the intake port 2 of the cylinder.

Further, the engine 1 is furnished with a crank angle sensor 18 and a water temperature sensor 20. The crank angle sensor 18 includes a rotary encoder which is associated with a cam shaft. Based on the output of the rotary encoder, the sensor 18 delivers a reference signal for the rotational angle of a crankshaft of the engine 1, that is, a crank angle. The water temperature sensor 20 detects the temperature of cooling water of the engine 1.

The throttle valve 7 is provided with a sensor 19 for detecting its opening and an idle switch 26 for detecting its fully-closed state. The air cleaner 5 is provided with a sensor 21 for detecting the atmospheric pressure. Also, the intake pipe 9 is fitted with a sensor 22 which is situated between the air cleaner 5 and the airflow sensor 6. The sensor 22 detects the temperature of the intake air.

The sensors and switch described above are connected electrically to an electronic control unit (ECU) 23. The ECU 23, which is located in the cabin of the automobile, includes input and output interfaces, memory units, such as a ROM, RAM, nonvolatile RAM, etc., a microprocessor unit (MPU), and a timer counter. The ROM is previously stored with a large number of control programs.

When the ECU 23 is supplied with outputs from the aforesaid sensors through the input interface thereof, it detects the intake air feed rate, oxygen concentrations of the exhaust gas, throttle opening, cooling water temperature, intake air temperature, and atmospheric pressure, etc. in accordance with the supplied outputs. Also, the ECU 23 detects ah engine speed Ne on the basis of the time interval of the reference signal delivered from the crank angle sensor 18. Based on the intake air feed rate and the engine speed Ne, moreover, the ECU 23 calculates the volumetric efficiency $\eta_v$ of the engine 1. The volumetric efficiency $\eta_v$ calculated in the ECU 23 is properly corrected by means of the atmospheric pressure, intake air temperature, etc.

On the other hand, the output interface of the ECU 23 is connected electrically with the fuel injectors 3, the ISC valve 8, the igniter 24, an alarm lamp 32, etc. The alarm lamp 32, which is located in the cabin of the automobile, is lit in case of a trouble.

The ECU 23 generates driving signals and control signals in accordance with the aforesaid detection information and calculation information, and supplies them to the fuel injectors 3, igniter 24, and ISC valve 8, individually. When signals are supplied from the ECU 23 to the igniter 24, for example, the igniter 24 is actuated, and at the same time, the ignition timing for the engine 1 is controlled. When a signal is supplied from the ECU 23 to the ISC valve 8, control of intake air supply for idling is carried out.

When the control signals are supplied from the ECU 23 to the fuel injectors 3, the injectors 3 are actuated, and at the same time, feedback control of the air-fuel ratio is carried out. Based on the outputs from the $O_2$ sensors 12 and 25, the ECU 23 can also discriminate reduction of the purifying capacity of the three-way catalyst 30 in the catalytic converter 13.

The following is a detailed description of the feedback control of the air-fuel ratio and the detection of reduction of the purifying capacity of the three-way catalyst 30.

An outline of the air-fuel ratio feedback control will be explained first. In this control, the feed rates of the fuel to be injected from the fuel injectors 3 are corrected in accordance with the outputs from the $O_2$ sensors 12 and 25, whereby the actual air-fuel ratio of the air-fuel mixture supplied to the combustion chamber 15 is kept at the value of a target air-fuel ratio (e.g., at a value in the vicinity of the theoretical air-fuel ratio). Even if the quantity of fuel injected from the fuel injectors 3 for each cycle is corrected, the actual air-fuel ratio cannot be immediately varied to the target value or steadily kept at the target value.

Even though the actual air-fuel ratio is in the vicinity of the target air-fuel ratio, therefore, corrective control is carried out for the quantity of fuel injected from the fuel injectors 3. In this corrective control, incremental correction to increase the fuel injection quantity by predetermined correction values and decremental correction to decrease the injection quantity by predetermined correction values are cyclically repeated in accordance with the outputs from the $O_2$ sensors 12 and 25. As a result, the actual air-fuel ratio fluctuates in the vicinity of the target air-fuel ratio, so that the average value of the actual air-fuel ratio can be maintained steadily at the target air-fuel ratio.

Figure 2:
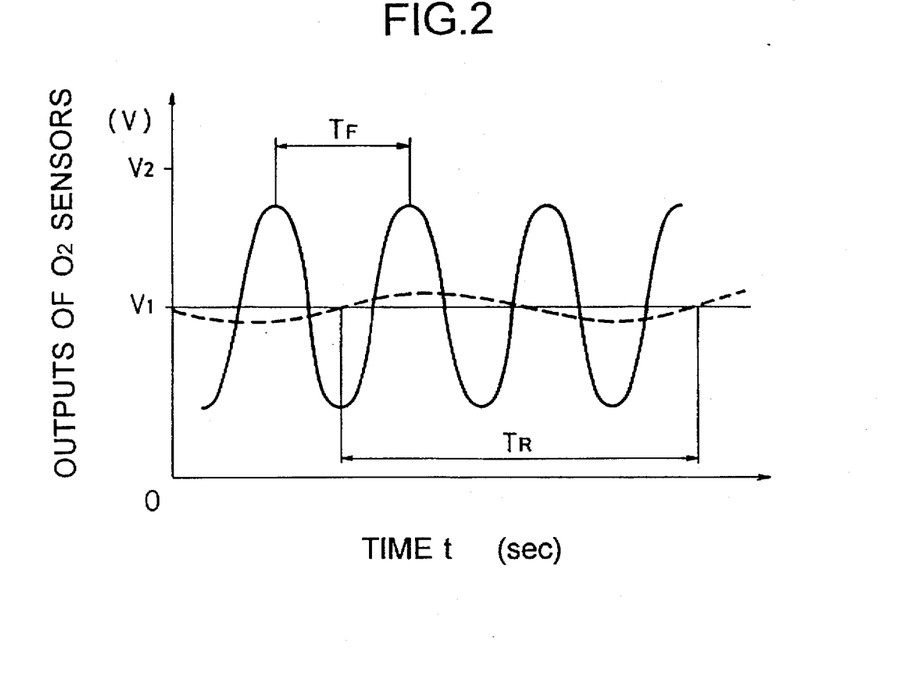
FIG. 2 is a graph showing output characteristics of $O_2$ sensors shown in FIG. 1.

Referring to FIG. 2, the outputs of the $O_2$ sensors 12 and 25 are represented by full line and broken line, respectively. In the exhaust pipe 14, the $O_2$ sensor 12 is situated on the upstream side of the catalytic converter 13, so that it can accurately detects the oxygen concentration of the exhaust gas from the engine 1. Therefore, if the incremental and decremental corrections for the quantity of fuel injection from the fuel injectors 3 are repeated cyclically, as mentioned before, the output of the $O_2$ sensor 12 also varies cyclically, as seen from full line in FIG. 2. In this case, the output (full line) of the $O_2$ sensor 12 varies centering around a voltage value $V_1$ (e.g., 0.5 volt) which corresponds to the oxygen concentration of the exhaust gas obtained when the air-fuel ratio of the air-fuel mixture is on the level of the target air-fuel ratio, and its maximum value corresponds to a maximum voltage value $V_2$ (e.g., 1 volt). A period $T_F$, in which the output of the $O_2$ sensor 12 varies, is identical with the period in which the incremental correction (or decremental correction) for the injection quantity is repeated.

The three-way catalyst 30 in the catalytic converter 13 has a function to store a predetermined quantity of oxygen molecules or $O_2$ temporarily therein. If the catalyst 30 can afford to store $O_2$ as the exhaust gas passes therethrough $O_2$ in the exhaust gas is seized by the catalyst 30.

The $O_2$ sensor 25 is situated on the downstream side of the catalytic converter 13, and detects the oxygen concentration of the exhaust gas passed through the three-way catalyst 30. As seen from FIG. 2, therefore, the output (broken line) of the $O_2$ sensor 25, like the output (full line) of the $O_2$ sensor 12, varies centering around the voltage value $V_1$. When the catalyst 30 functions normally, as mentioned before, that is, when $O_2$ in the exhaust gas is temporarily stored in the catalyst 30, the variation of the output of the $O_2$ sensor 25 is much smaller than that of the output of the $O_2$ sensor 12, and its $T_R$ period is longer than the period $T_F$ of the output of the sensor 12. Thus, a frequency $f_F$ $(=1/T_F)$ of the output of the sensor 12 is higher than a frequency $f_R$ $(=1/T_R)$ of the output of the sensor 25.

When the three-way catalyst 30 functioning normally, the frequencies $f_F$ and $f_R$ of the respective outputs of the $O_2$ sensors 12 and 25 are restricted to substantially fixed values by the specific response speeds of the sensors 12 and 25 themselves. More specifically, the frequencies $f_F$ and $f_R$ of the outputs of the $O_2$ sensors 12 and 25 are stabilized at, for example, $f_{FO}$ and $f_{RO}$ ($f_{FO} \gg f_{RO}$ ($\leqq 0$)), respectively.

Figure 3:
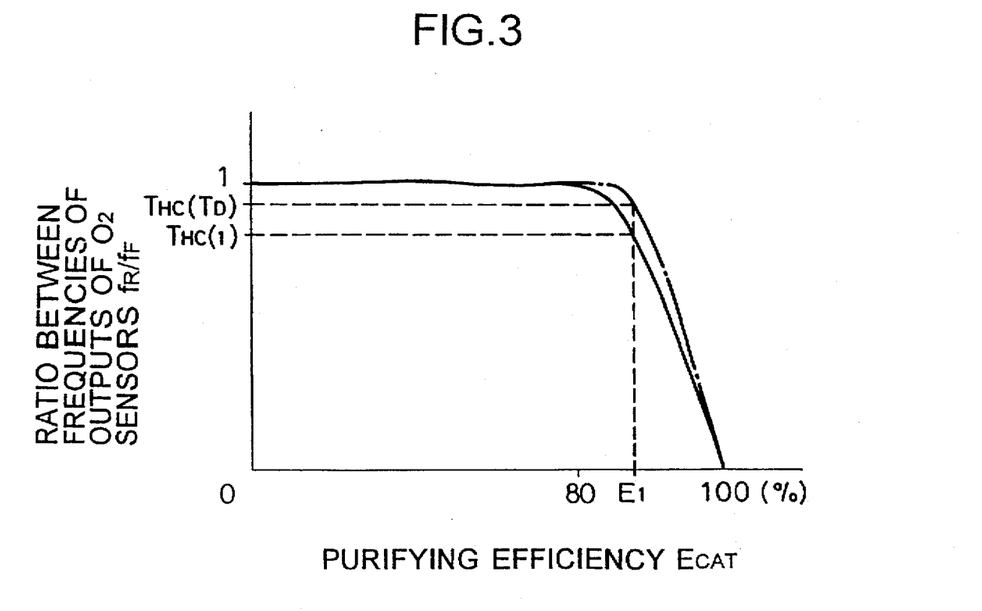
FIG. 3 is a graph showing the relationship between the purifying efficiency of a three-way catalyst shown in FIG. 1 and the ratio between the respective frequencies of outputs from the $O_2$ sensors.

FIG. 3 shows the relationship between a purifying efficiency $E_{CAT}$ of the three-way catalyst 30 for removing HC, CO and $NO_x$ from the exhaust gas and the ratio of the frequency $f_R$ to the frequency $f_F$, i.e., $f_R/f_F$, in the case where the three-way catalyst 30 is functioning normally.

When the three-way catalyst 30 is functioning normally or if its purifying efficiency $E_{CAT}$ is high, that is, $E_{CAT}=100\%$, as seen from FIG. 3, the frequencies $f_F$ and $f_R$ of the outputs of the $O_2$ sensors are $f_{FO}$ and $f_{RO}$, respectively, as mentioned before, and $f_R/f_F$ is 0.

With the passage of time for the use of the three-way catalyst 30, however, its purifying efficiency $E_{CAT}$ lowers gradually. Thus, the function of the catalyst 30 to accelerate the oxidation of HC and CO in the exhaust gas and the $O_2$ storage function of the catalyst 30 are deteriorated. Accordingly, $O_2$ in the exhaust gas cannot be easily seized by the catalyst 30, so that more $O_2$ passes through the catalyst 30. This implies that the oxygen concentration of the exhaust gas on the downstream side of the three-way catalyst 30 gradually approaches that of the exhaust gas on the upstream side of the catalyst 30. Thus, the output characteristic of the $O_2$ sensor 25 gradually changes to resemble that of the $O_2$ sensor 12.

When the purifying efficiency $E_{CAT}$ of the three-way catalyst 30 is lowered to 80% or less, the frequency $f_R$ of the output of the $O_2$ sensor 25 becomes equal to the frequency $f_F$ of the output of the $O_2$ sensor 12, so that $f_R/f_F$ is 1, as shown in FIG. 3. More specifically, $f_R/f_F$ starts to increase suddenly as the purifying capacity of the catalyst 30 decreases. When the purifying efficiency $E_{CAT}$ of the catalyst 30 is lowered to 80%, $f_R/f_F$ attains its maximum value 1.

As described above, there is a relation between the purifying efficiency $E_{CAT}$ of the three-way catalyst 30 and $f_R/f_F$ such that $f_R/f_F$ increases suddenly as $E_{CAT}$ lowers. By detecting the trend of change of $f_R/f_F$ by means of the ECU 23, therefore, it can be determined whether or not the purifying capacity of the catalyst 30 is lowered.

Figure 4:
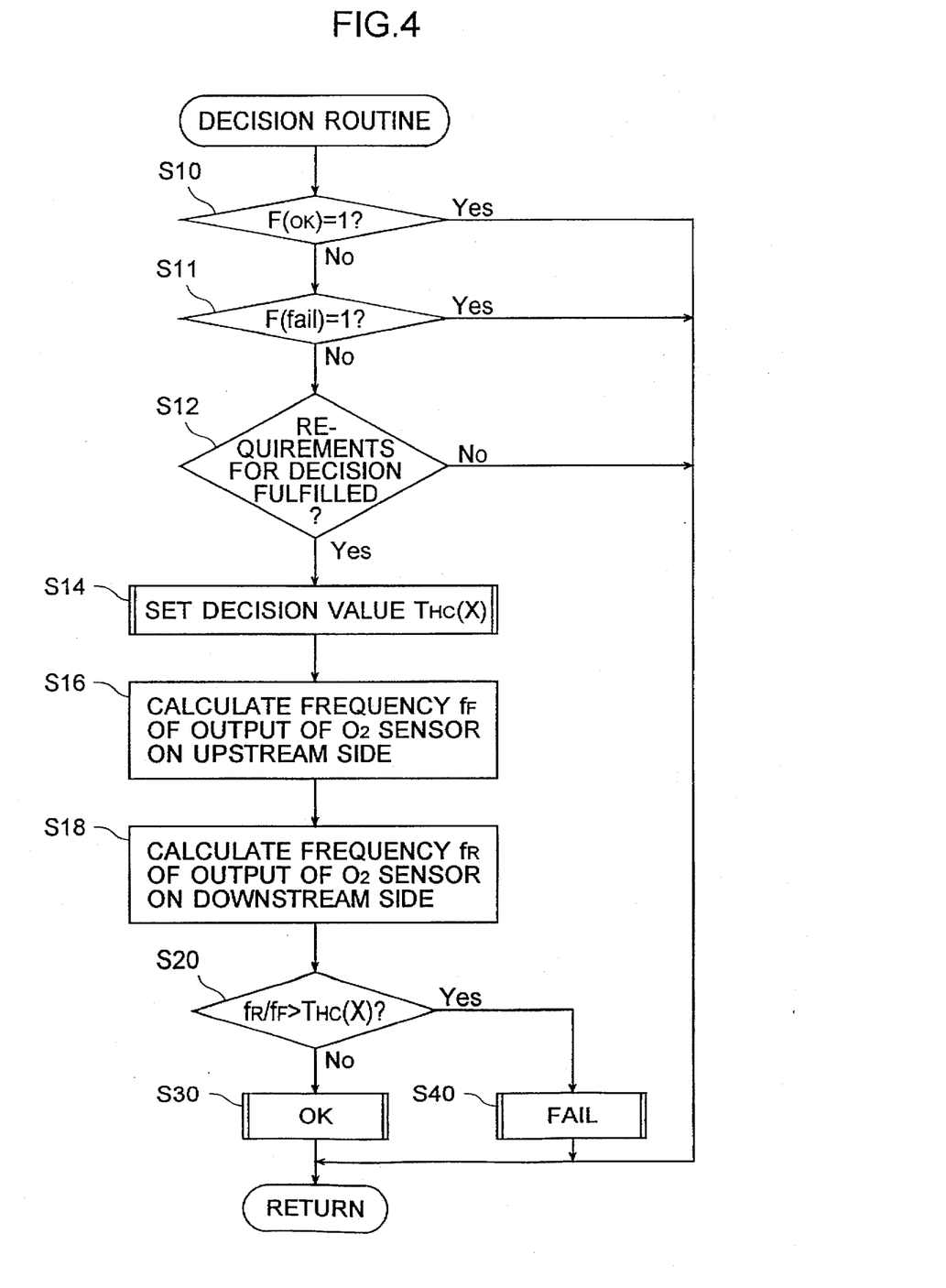
FIG. 4 is a flowchart showing a decision routine according to a first embodiment executed by an ECU shown in FIG. 1.

Referring now to FIG. 4, a routine according to a first embodiment for discriminating the reduction of the purifying capacity of the three-way catalyst 30 will be described.

This routine is executed by the ECU 23 every time the engine 1 is started. First, the ECU 23 successively determines whether or not the values of flags F(ok) and F(fail) are 1 (Steps S10 and S11). When the ignition switch of the engine 1 is turned off, that is, when the engine 1 is stopped, the ECU 23 resets the value of the flag F(ok) at 0. Immediately after the start of the engine 1, therefore, the result of decision in Step S10 is bound to be No, so that the ECU 23 executes the next process of Step S11. On the other hand, the flag F(fail) is at 0 unless it is changed to 1 in any of the following steps. Accordingly, the result of decision in Step S11 is also No, whereupon the ECU 23 executes the next process of Step S12.

In Step S12, it is determined whether or not requirements for the discrimination of the reduction of the purifying capacity of the three-way catalyst 30 is fulfilled. The requirements include, for example, the following conditions.

(a) Feedback control of the aforesaid air-fuel ratio is executed normally.

(b) The engine speed Ne and the volumetric efficiency $\eta_\nu$ are within their respective predetermined ranges.

This decision routine is intended to discriminate the reduction of the purifying capacity of the three-way catalyst 30 in accordance with the trend of change of $f_R/f_F$, as mentioned before. Therefore, it is carried out on the assumption that both the $O_2$ sensors 12 and 25 operate normally, and the feedback control of the air-fuel ratio is executed properly.

If the engine speed Ne and the volumetric efficiency $\eta_\nu$ are not within their respective predetermined ranges, on the other hand, the oxygen concentration of the exhaust gas is not stable, so that the feedback control of the air-fuel ratio cannot be carried out normally. For normal feedback control of the air-fuel ratio, therefore, the engine speed Ne and the volumetric efficiency $\eta_\nu$ should be within the following ranges:

$$Ne_1 < Ne < Ne_2, \quad (1)$$

$$\eta_{\nu 1} < \eta_\nu < \eta_{\nu 2}, \quad (2)$$

where $Ne_1$, $Ne_2$, $\eta_{\nu 1}$ and $\eta_{\nu 2}$ are threshold values. In the case where the engine 1 is connected to an automatic transmission, for example, $Ne_1$, $Ne_2$, $\eta_{\nu 1}$ and $\eta_{\nu 2}$ are 1,400 rpm, 3,000 rpm, 25%, and 60%, respectively.

The discrimination of the reduction of the purifying capacity of the three-way catalyst 30 is also based on requirements that the temperature of the cooling water for the engine 1 is within a predetermined range, that the airflow sensor 6 functions normally, etc., as well as the aforesaid requirements (a) and (b).

If either of the requirements in Step S12 is not fulfilled, the result of decision in Step S12 is No. In this case, the ECU 23 stands by until the result of decision in Step S12 becomes Yes.

When the result of decision in Step S12 becomes Yes, thereafter, the ECU 23 sets a decision value $T_{HC}(X)$ for $f_R/f_F$ (Step S14). As shown in FIG. 3, the decision value $T_{HC}(X)$ is adjusted to the value of $f_R/f_F$, i.e., $T_{HC}(1)$ (e.g., 0.8), which is obtained when the purifying efficiency $E_{CAT}$ of the three-way catalyst 30 is lowered to $E_1$ (e.g., 85%).

Since the $O_2$ sensor 12 is situated nearer to the engine 1 than the $O_2$ sensor 25, it is more susceptible to heat from the exhaust gas. When the $O_2$ sensor 12 is subject to thermal degradation, the responsiveness of the sensor 12 worsens, so that the frequency $f_F$ of its output is lowered. Accordingly, the characteristic of $f_R/f_F$ compared with the purifying efficiency $E_{CAT}$ changes in the manner indicated by dashed line in FIG. 3. In this case, the value of $f_R/f_F$ obtained when the purifying efficiency $E_{CAT}$ of the three-way catalyst 30 is lowered to $E_1$ changes from $T_{HC}(1)$ to $T_{HC}(T_D)$. Thus, in order to set accurately the decision value $T_{HC}(X)$, that is, the value of $f_R/f_F$ obtained when the purifying efficiency $E_{CAT}$ is lowered to $E_1$, the value $T_{HC}(X)$ must be changed in consideration of the deterioration of the responsiveness of the $O_2$ sensor 12.

In Step S14, therefore, the ECU 23 sets the decision value $T_{HC}(X)$ in the following manner.

Since the decision value $T_{HC}(X)$ must be set in consideration of the response delay of the $O_2$ sensor 12, the ECU 23 is expected first to obtain a delay time $T_D$ of the response of the sensor 12. To attain this, the ROM of the ECU 23 is previously stored with maps shown in FIGS. 5 and 6. These maps are obtained from test results.

Figure 5:
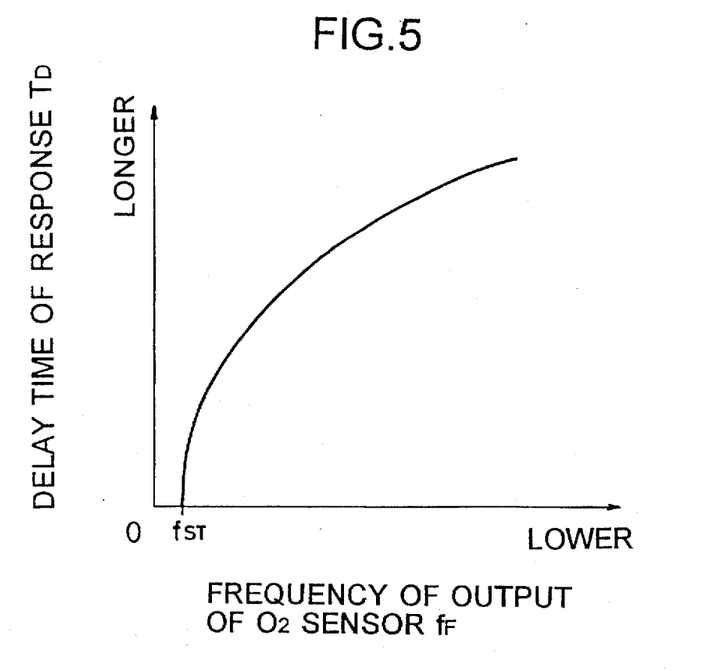
FIG. 5 is a graph showing the relationship between the frequency of the output of the $O_2$ sensor on the upstream side and the delay time of the response of the sensor output.

The map of FIG. 5 represents the relationship between the frequency $f_F$ of the output of the $O_2$ sensor 12 and the delay time $T_D$. In a test for preparing the map of FIG. 5, the air-fuel ratio of the air-fuel mixture, that is, A/F, is varied with a predetermined frequency $f_{ST}$ during the operation of the engine 1. If the $O_2$ sensor 12 is not subject to thermal degradation, in this case, the frequency $f_F$ of the output of the sensor 12 is substantially equal to $f_{ST}$. Thus, in this case, the delay time $T_D$ of the response of the sensor 12 is substantially 0. As the operation of the engine 1 is continued for many hours such that the thermal degradation of the $O_2$ sensor 12 advances gradually, the frequency $f_F$ of the output of the sensor 12 decreases gradually. Accordingly, the delay time $T_D$ of the response of the sensor 12 can be obtained in accordance with the rate of decrease of the frequency $f_F$ compared with the frequency $f_{ST}$. Thus, the map of FIG. 5, which shows the relationship between the frequency $f_F$ and the delay time $T_D$, can be obtained.

Figure 6:
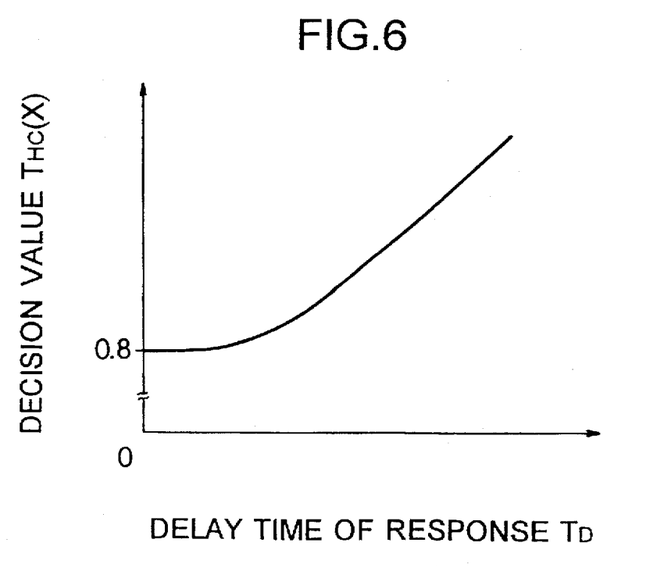
FIG. 6 is a graph showing the relationship between the delay time of the response and a decision value.

On the other hand, the map of FIG. 6 represents the decision value $T_{HC}(X)$ compared with the delay time $T_D$. When the delay time $T_D$ is 0, that is, when the $O_2$ sensor 12 is operating normally, as seen from FIG. 6, the decision value $T_{HC}(X)$ is adjusted to $T_{HC}(1)$, as mentioned before. If the delay time $T_D$ increases, however, the decision value $T_{HC}(X)$ also increases gradually. Thus, the decision value $T_{HC}(X)$ always accurately represents the value of $f_R/f_F$ for the point of time when the purifying efficiency $E_{CAT}$ of the three-way catalyst 30 is lowered to $E_1$.

Figure 7:
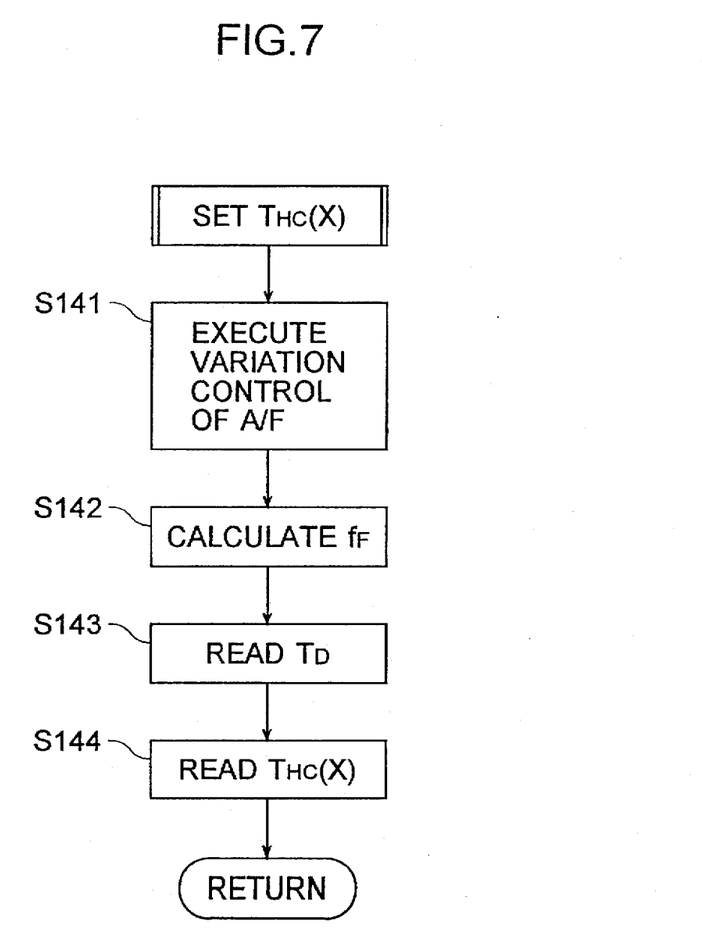
FIG. 7 is a flowchart showing details of Step S14 in FIG. 4.

In setting the decision value $T_{HC}(X)$, as is evident from the above description, the ECU 23 first varies the ratio A/F with the frequency $f_{ST}$ for a predetermined period of time (Step S141) during the operation of the engine 1, as shown in the subroutine of FIG. 7. In this case, the aforesaid feedback control of the air-fuel ratio is interrupted temporarily, and control for compulsorily varying A/F is executed without regard to the feedback control. In this A/F variation control, the quantity of fuel injected from the fuel injector 3 is alternately increased and decreased in cycles corresponding to the frequency $f_{ST}$, whereby A/F oscillates between the rich side and the lean side. The frequency $f_{ST}$ is adjusted to a value not greater than $f_{FO}$.

In the next process of Step S142, the ECU 23 calculates the frequency $f_F$ in accordance with the output of the $O_2$ sensor 12. More specifically, the ECU 23 measures the number of times that a voltage value corresponding to the theoretical air-fuel ratio is crossed by the output of the $O_2$ sensor 12 during a predetermined period of time (e.g., 10 seconds), and calculates the frequency $f_F$ on the basis of the measured number of times.

Thereafter, the ECU 23 reads the delay time $T_D$ of the response corresponding to the calculated frequency $f_F$ from the map of FIG. 5 (Step S143), and reads the decision value $T_{HC}(X)$ corresponding to the delay time $T_D$ from the map of FIG. 6 (Step S144).

After Step S141 or S14 has been executed, the control of A/F is changed over to the aforesaid feedback control immediately.

In the next process of Step S16, the ECU 23 calculates the frequency $f_F$ again in accordance with the output of the $O_2$ sensor 12. In this case, the ECU 23 measures the number of times that a voltage value V1 corresponding to the target theoretical air-fuel ratio is crossed by the output of the $O_2$ sensor 12 during a predetermined period of time (e.g., 10 seconds), and calculates the frequency $f_F$ on the basis of the measured number of times.

In the next process of Step S18, the ECU 23 calculates the frequency $f_R$ in accordance with the output of the $O_2$ sensor 25, in the same manner as in the calculation of the frequency $f_F$.

Thereafter, the ECU 23 obtains $f_R/f_F$ from the calculated frequencies $f_F$ and $f_R$, and determines whether or not $f_R/f_F$ is greater than the decision value $T_{HC}(X)$ (Step S20). If the result of decision in Step S20 is No, that is, if the value of $f_R/f_F$ is found to be smaller than the value $T_{HC}(X)$, then it implies that the purifying efficiency $E_{CAT}$ of the three-way catalyst 30 is not lowered to $E_1$, as seen from FIG. 3. Accordingly, the ECU 23 executes an OK routine of Step S30.

If the result of decision in Step S20 is Yes, in contrast with this, then it implies that the value of $f_R/f_F$ is greater than the decision value $T_{HC}(X)$ and that the purifying efficiency $E_{CAT}$ of the three-way catalyst 30 is lowered to $E_1$. Accordingly, the ECU 23 executes a FAIL routine of Step S40.

Since the decision value $T_{HC}(X)$ is a variable which is set in consideration of the thermal degradation of the $O_2$ sensor 12, as mentioned before, the decision in Step S20 can be carried out accurately. Thus, Step S30 is executed when the purifying efficiency $E_{CAT}$ of the three-way catalyst 30 is high enough for normal operation, and Step S40 is executed, on the other hand, when the purifying efficiency $E_{CAT}$ of the catalyst 30 is not higher than $E_1$, that is, when the catalyst 30 cannot function normally.

Figure 8:
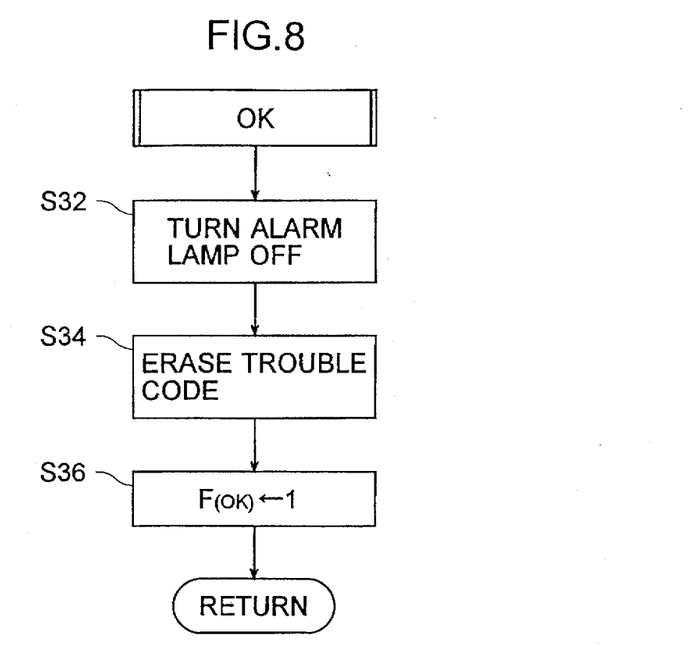
FIG. 8 is a flowchart showing details of Step S30 in FIG. 4.

In the OK routine of Step S30, as shown in FIG. 8, the ECU 23 first switches off the alarm lamp 32 in the cabin of the automobile (Step S32), and erases a trouble code for the three-way catalyst 30 in the nonvolatile RAM (Step S34). Thereafter, the ECU 23 sets 1 in the flag F(ok) (Step S36), whereupon the OK routine is finished.

While the ECU 23 repeatedly executes the decision routine of FIG. 4 again, thereafter, the result of decision in Step S10 is Yes, so that Step S11 and its subsequent steps are not executed. In this case, the ECU 23 repeatedly executes only Step S10 of the decision routine.

Figure 9:
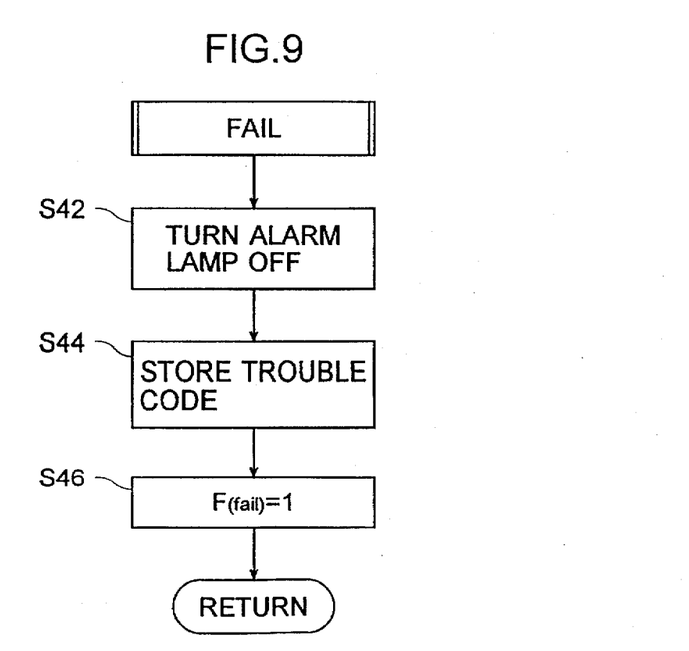
FIG. 9 is a flowchart showing details of Step S40 in FIG. 4.

In the FAIL routine of Step S40, as shown in FIG. 9, on the other hand, the ECU 23 first switches on the alarm lamp 32 (Step S42), and stores the nonvolatile RAM with the trouble code for the three-way catalyst 30 (Step S42). Thereafter, the ECU 23 sets 1 in the flag F(fail) (Step S46), whereupon the FAIL routine is finished. The alarm lamp 32 is kept on unless Step S30 is executed.

While the ECU 23 repeatedly executes the decision routine of FIG. 4 again, thereafter, the flag F(ok) is still reset at 0, so that Step S11 is executed after Step S10. At this point of time, the result of decision in Step S11 is Yes, so that Step S12 and the subsequent steps are not executed. In this case, the ECU 23 repeatedly executes only Steps S10 and S11 of the decision routine.

When the result of decision in Step S20 becomes Yes, as mentioned before, the alarm lamp 32 is turned on, so that a driver can recognize the occurrence of a trouble in the automobile by the glowing lamp 32. When the automobile is sent for repair, thereafter, a repairman can notice the reduction of the purifying capacity of the three-way catalyst 30 by reading the trouble code from the nonvolatile RAM in the ECU 23. Thus, the repairman can easily remove the trouble by replacing the catalyst 30 with a new one.

Figure 10:
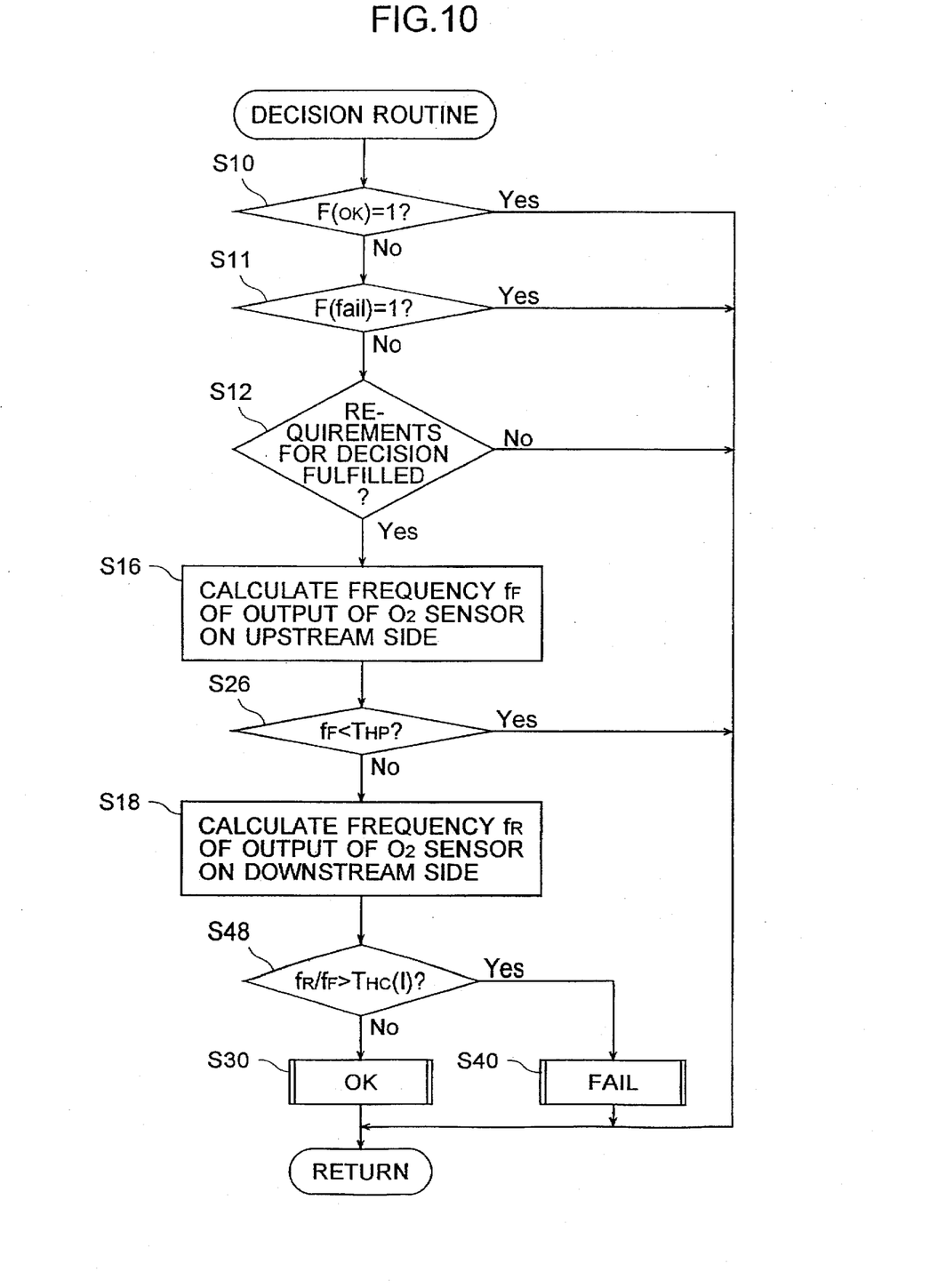
FIG. 10 is a flowchart showing a decision routine according to a second embodiment.

Referring to FIG. 10, there is shown a decision routine according to a second embodiment. The following is a description of only differences of this decision routine from the decision routine of FIG. 4.

In the case of the decision routine of FIG. 10, Step S14 of FIG. 4 is omitted. If the result of decision in Step S12 is Yes, the ECU 23 executes Step S16 directly after Step S12.

Step S26 is interposed between Steps S16 and S18. In Step S26, the ECU 23 determines whether or not the frequency $f_F$ calculated in Step S16 is smaller than a predetermined value $T_{HP}$ (e.g., 0.1 Hz). The predetermined value $T_{HP}$ is set in accordance with the result of a test for measuring the thermal degradation of the $O_2$ sensor 12 and in consideration of the aforesaid decision value $T_{HC}(1)$ of $f_R/f_F$. More specifically, the predetermined value $T_{HP}$ is a value such that the frequency $f_F$ of the output of the $O_2$ sensor 12 is so much lower than its allowable range that $f_R/f_F$ cannot accurately indicate the purifying efficiency $E_{CAT}$ of the three-way catalyst 30.

In the decision routine of FIG. 10, the ECU 23 executes Step S48 in place of Step S20 of FIG. 4. In Step S48, the ECU 23 determines whether or not $f_R/f_F$ is greater than the decision value $T_{HC}(1)$, a fixed value. Depending on the result of decision in Step S48, the ECU 23 executes Step S30 or S40.

According to the decision routine of the second embodiment, the ECU 23 never executes the decision in Step S48 in the case where the result of decision in Step S26 is Yes so that the $O_2$ sensor 12 is subject to thermal degradation. Thus, the ECU 23 can be prevented from giving an erroneous decision on the reduction of the purifying capacity of the three-way catalyst 30.

When the decision in Step S48 is executed, the result of decision in Step S26 is already No. In this case, the $O_2$ sensor 12 functions normally without being subject to thermal degradation. Accordingly, the result of decision in Step S48 accurately indicates the occurrence of the reduction of the purifying capacity of the three-way catalyst 30, that is, whether or not the purifying efficiency $E_{CAT}$ of the catalyst 30 is lowered to $E_1$ or less.

Figure 11:
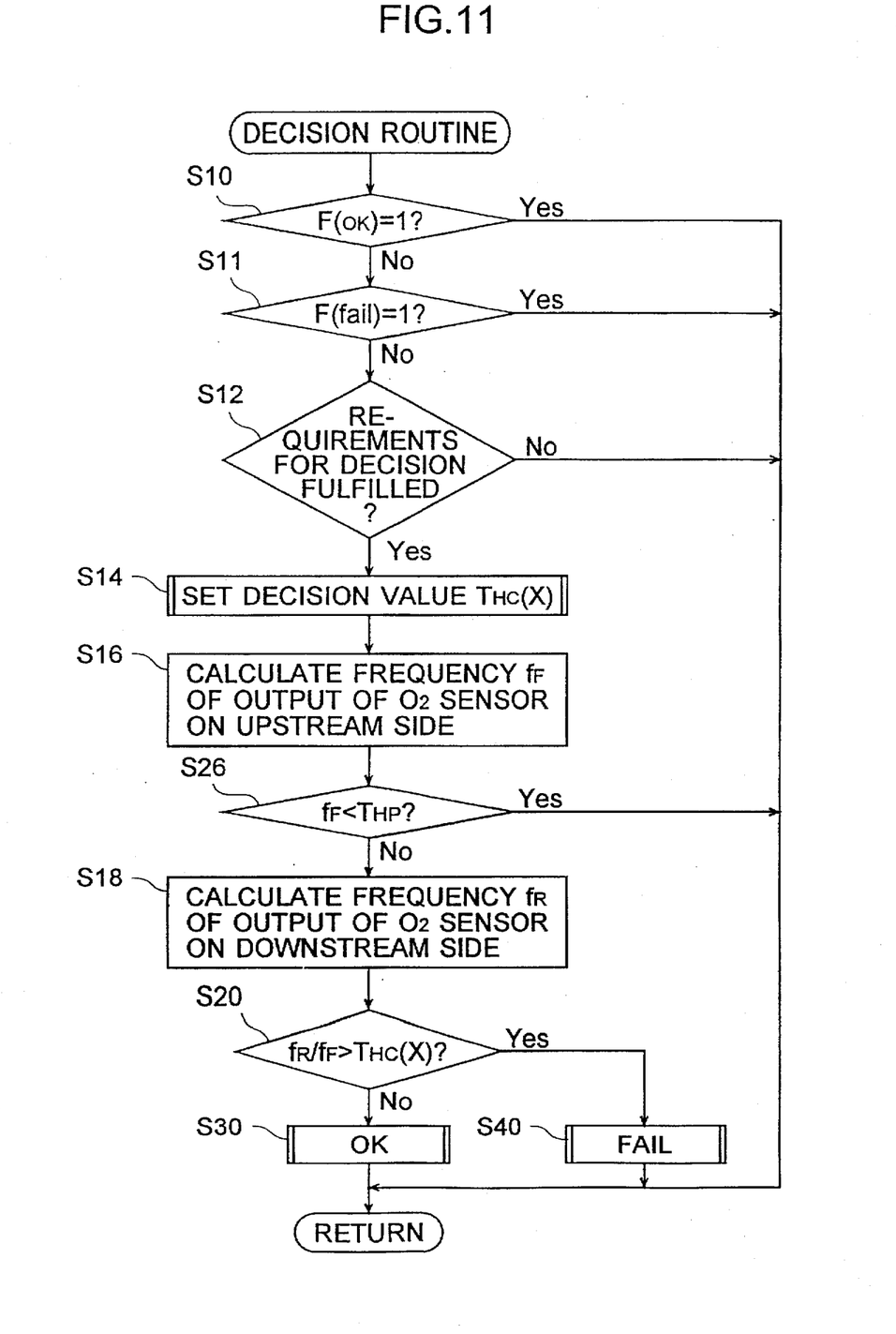
FIG. 11 is a flowchart showing a decision routine according to a third embodiment.

Referring to FIG. 11, there is shown a decision routine according to a third embodiment. This routine is a combination of the decision routines according to the first and second embodiments, and enjoys the advantages of both these foregoing embodiments.

In the case of the decision routine of the third embodiment, the occurrence of thermal degradation of the $O_2$ sensor 12 may be discriminated in Step S26 by determining whether or not the decision value $T_{HC}(X)$ set in Step S14 is greater than a predetermined value instead of determining whether or not the frequency $f_F$ is smaller than the predetermined value $T_{HP}$. In this case, the predetermined value for the decision value $T_{HC}(X)$ is obtained beforehand on the basis of experimental data.

Figure 12:
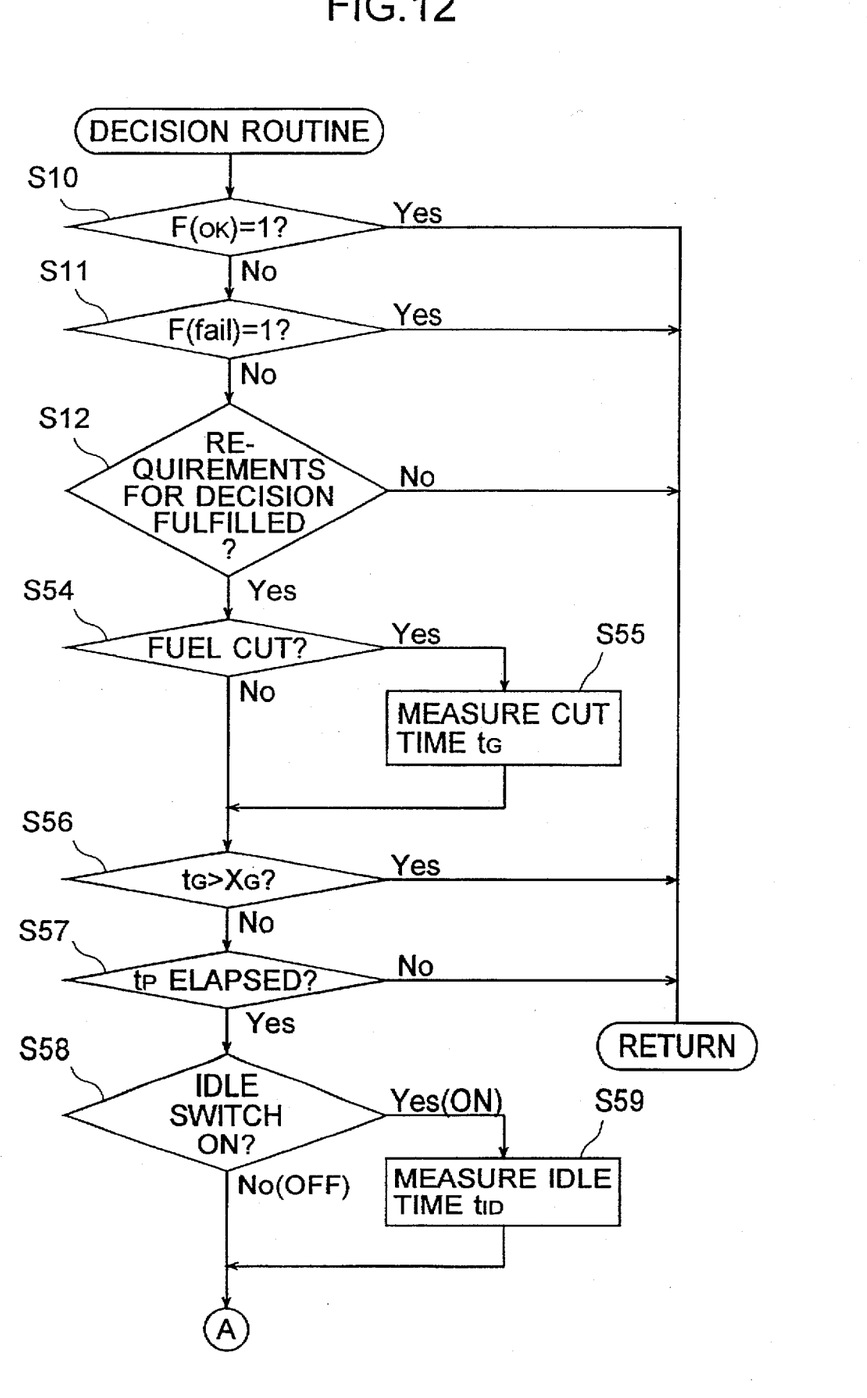
FIG. 12 is a flowchart showing part of a decision routine according to a fourth embodiment.
Figure 13:
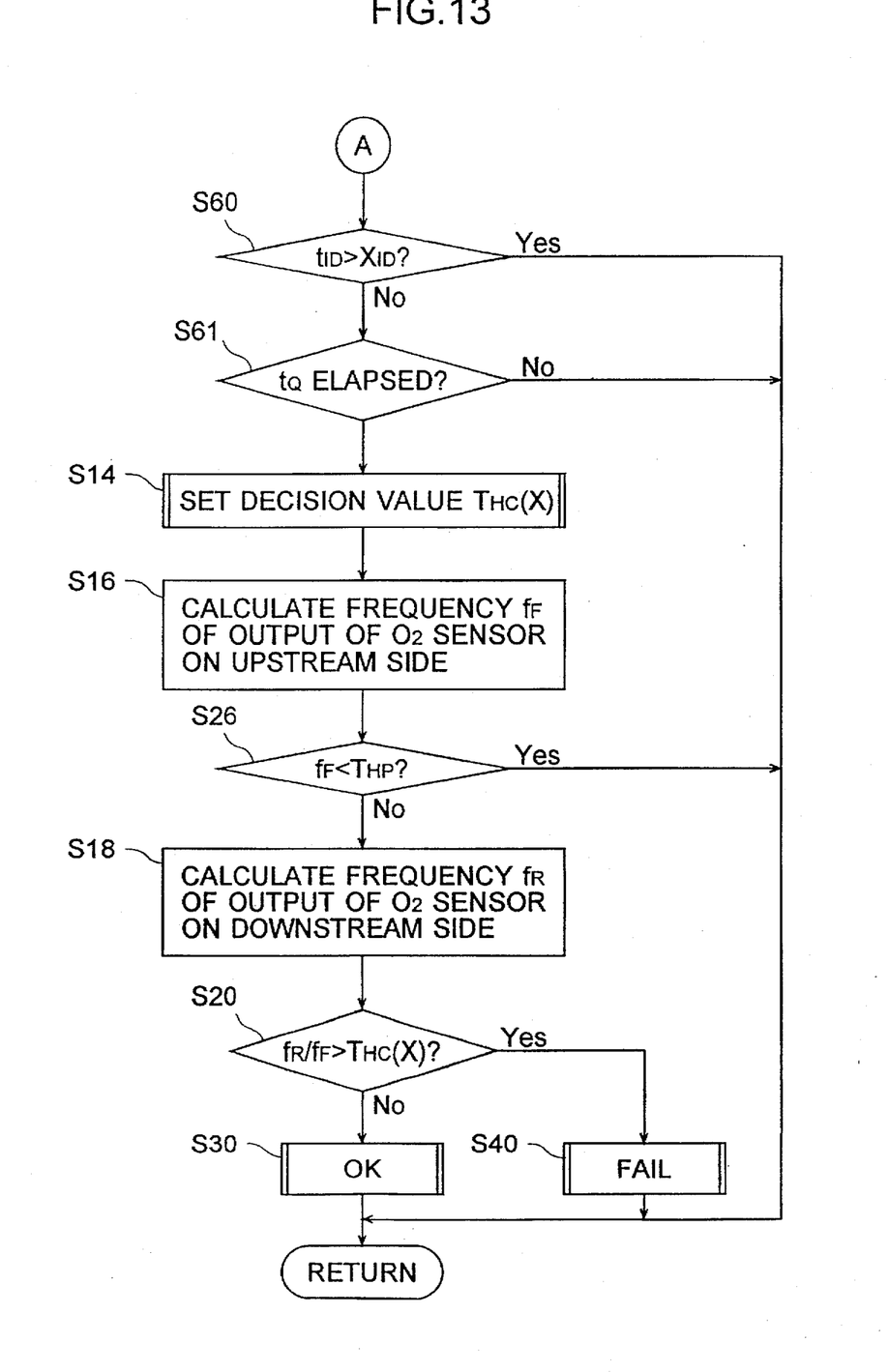
FIG. 13 is a flowchart showing the remainder of the decision routine according to the fourth embodiment.

Referring to FIGS. 12 and 13, there is shown a decision routine according to a fourth embodiment. In this routine, decisions in Steps S54 to S61 are additionally given following Step S12.

In Step S54, the ECU 23 determines whether or not the fuel supply from the fuel injectors 3 is interrupted. More specifically, the ECU 23 executes the decision in Step S54 depending on the presence of driving signals to be supplied to the fuel injectors 3. In the case where the automobile is running down a slope with the throttle valve 7 fully closed, the fuel injection from the fuel injectors 3 may possibly be stopped even though the engine speed Ne is not lower than $Ne_1$ (1,400 rpm), for example.

If the result of decision in Step S54 is Yes, the ECU 23 starts to measure the time elapsed after the interruption of the fuel supply, that is, cut time $t_G$ (Step S55), and then executes Step S56. If the result of decision in Step S54 is No, on the other hand, the ECU 23 resets the cut time $t_G$ at 0 in Step S54, and then executes Step S56.

In Step S56, the ECU 23 determines whether or not a predetermined time $X_G$ is exceeded by the cut time $t_G$. If the result of decision in Step S56 is Yes, it can be presumed that the temperature of the exhaust gas from the engine 1 is low and the temperatures of the $O_2$ sensors 12 and 25 themselves are lower than the workable temperature. In this situation, therefore, the outputs of the sensors 12 and 25 are not stable. Accordingly, the ECU 23 interrupts the execution of Step S57 and the subsequent steps, and gives no decision on the reduction of the purifying capacity of the three-way catalyst 30.

In Step S57, the ECU 23 determines whether or not a recovery time $t_p$ is up. The recovery time $t_p$ is the time elapsed after the result of decision in Step S54 is changed to No after the change of the result of decision in Step S56 to Yes, and is measured in the ECU 23.

It is immediately after the fuel supply is restarted when the result of decision in Step S57 becomes No. Presumably, in this state, therefore, the temperature of the exhaust gas is not high enough, and the temperatures of the $O_2$ sensors 12 and 25 themselves are still low. Also in this situation, therefore, the ECU 23 interrupts the execution of Step S58 and the subsequent steps, and gives no decision on the reduction of the purifying capacity of the three-way catalyst 30.

In Step S58, the ECU 23 determines whether or not the output of the idle switch 26 is on. If the result of decision in Step S58 is Yes, the ECU 23 starts to measure the time elapsed after the activation of the switch 26, that is, idle time $t_{ID}$ (Step S59), and then executes the next process of Step S60 (FIG. 13). If the result of decision in Step S58 is No, on the other hand, the ECU 23 resets the idle time $t_{ID}$ at 0 in Step S58, and then executes Step S60.

In Step S60, the ECU 23 determines whether or not a predetermined time $X_{ID}$ is exceeded by the idle time $t_{ID}$. If the result of decision in Step S60 is Yes, then it will be able to be presumed that the temperature of the exhaust gas from the engine 1 is low and the temperatures of the $O_2$ sensors 12 and 25 themselves are too low, owing to prolonged continuous idle operation of the engine 1. In this situation, therefore, the ECU 23 interrupts the execution of Step S61 and the subsequent steps, and gives no decision on the reduction of the purifying capacity of the three-way catalyst 30.

In Step S61, the ECU 23 determines whether or not a recovery time $t_Q$ is up. The recovery time $t_Q$ is the time elapsed after the result of-decision in Step S58 has been changed to No after the change of the result of decision in Step S60 to Yes, and is measured in the ECU 23.

It is immediately after the engine 1 is switched from the idle operation to its normal operation when the result of decision in Step S61 becomes No. Presumably, in this state, therefore, the temperature of the exhaust gas is not high enough, and the temperatures of the $O_2$ sensors 12 and 25 themselves are still low. Also in this situation, therefore, the ECU 23 interrupts the execution of Step S14 and the subsequent steps, and gives no decision on the reduction of the purifying capacity of the three-way catalyst 30.

If the results of decision in Steps S54, S56, S57, S58, S60 and S61 are all Yes, the ECU 23 executes Step S14 and the subsequent steps, and gives a decision on the reduction of the purifying capacity of the three-way catalyst 30 in the aforementioned manner.

What is claimed is:

1. An apparatus for detecting a reduction of purifying capacity of a catalytic converter in an exhaust gas passage through which exhaust gas from an internal combustion engine is guided, the catalytic converter having a catalyst therein for purifying the exhaust gas, said apparatus comprising:

a first sensor disposed in the exhaust gas passage at an upstream side of the catalytic converter, said first sensor detecting a component in the exhaust gas and outputting a first detection signal;

a second sensor for detecting the component in the exhaust gas flowing in a downstream side of the catalytic converter and outputting a second detection signal;

purification signal outputting means for outputting a purification signal indicative of a degree of reduction of the purifying capacity of the catalyst in accordance with said first and second detection signals from said first and second sensors;

reference value setting means for setting a reference value to be compared with said purification signal based on said first detection signal; and comparing means for comparing said purification signal from said purification signal outputting means with said set reference value and outputting a comparison result indicative of an occurrence of a predetermined reduction of the purifying capacity of the catalyst.

2. The detecting apparatus according to claim 1, wherein said purification signal outputting means generates said purification signal based on a ratio between respective frequencies of said first and second detection signals.

3. The detecting apparatus according to claim 2, wherein said reference value setting means generates a delay time in a response of said first detection signal and sets said reference value based on said calculated delay time.

4. The detecting apparatus according to claim 1, further comprising:

interrupting means for interrupting the comparison in said comparing means when a degradation signal indicative of a degradation of said first sensor exceeds an allowable value.

5. The detecting apparatus according to claim 4, wherein said purification signal outputting means generates said purification signal based on a ratio between respective frequencies of said first and second detection signals.

6. The detecting apparatus according to claim 5, wherein said reference setting means generates a delay time in a response of said first detection signal and sets said reference value based on said calculated delay time.

7. The detecting apparatus according to claim 1, further comprising:

third detecting means for detecting an operating state of the engine and interrupting means for interrupting said comparison result from said comparing means when said third detecting means detects a specific state of the engine.

8. The detecting apparatus according to claim 7, wherein the specific state is a state such that a throttle valve of the engine is fully closed and fuel supply to the engine is continued for a predetermined period of time, and that an idle operation of the engine is continued for a predetermined period of time.

9. The detecting apparatus according to claim 8, wherein said interrupting means continues to interrupt the delivery from said comparing means during the passage of a predetermined period of time after the removal of the specific state of the engine.

10. The detecting apparatus of claim 4, wherein said delay time is obtained from a first map based on said frequency of said first detection signal.

11. The detecting apparatus of claim 10, wherein said reference value is set from a second map based on said delay time.

12. The detecting apparatus of claim 6, wherein said allowable value is a prescribed value.

13. The detecting apparatus of claim 6, wherein said allowable value is set based on said set reference value.

14. The method of detecting a reduction of purifying capacity of a catalytic converter provided in an exhaust passage of an internal combustion engine, said exhaust passage further provided with a first gas sensor at an upstream of said catalytic converter and a second gas sensor at a downstream of said catalytic converter, the method comprising:

detecting a component of said gas by said first gas sensor and outputting a first detection signal;

detecting the component of said gas by said second gas sensor and outputting a second detection signal;

detecting a degree of reduction in said capacity of the catalytic converter and generating a purification signal;

setting a reference value to be compared with said purification signal based on said first detection signal; and comparing said purification signal with said set reference value to determine an occurrence of a predetermined reduction of purifying capacity of the catalytic converter.

15. The method of claim 14, wherein said measuring step generates said purification signal based on a ratio of a frequency of said first detection signal and a frequency of said second detection signal.

16. The method of claim 15, wherein said setting step generates a signal indicative of a delay time in response to said first detection signal and sets said reference value based on said generated delay time.

17. An apparatus for detecting a reduction of purifying capacity of a catalytic converter in an exhaust gas passage through which exhaust gas from an internal combustion engine is guided, the catalytic converter having a catalyst therein for purifying the exhaust gas, said apparatus comprising:

a first sensor disposed in the exhaust gas passage at an upstream side of the catalytic converter, said first sensor detecting a component in the exhaust gas and outputting a first detection signal;

a second sensor disposed in the exhaust gas passage at a downstream side of the catalytic converter, said second sensor detecting the component in the exhaust gas and outputting a second detection signal;

a frequency detecting unit which detects a first frequency of said first detection signal, said frequency indicative of a degradation of said first sensor;

a first comparing unit which compares said detected frequency with a first predetermined value and outputs a first comparison result;

a purification signal outputting unit which outputs, in accordance with said first comparison result, a purification signal indicative of a degree of reduction of the purifying capacity of the catalytic converter based on said first and second detection signals; and a second comparing unit which compares said purification signal with a second predetermined value to determine an occurrence of a predetermined reduction of purifying capacity of the catalytic converter.

18. The apparatus of claim 19, wherein said first comparing unit interrupts said first comparison result when said detected frequency is smaller than said first predetermined value.

* * * * *